March 16, 1948. R. K. HOPKINS 2,437,782
MANUFACTURE OF COMPOSITE METAL ARTICLES
Filed June 18, 1945
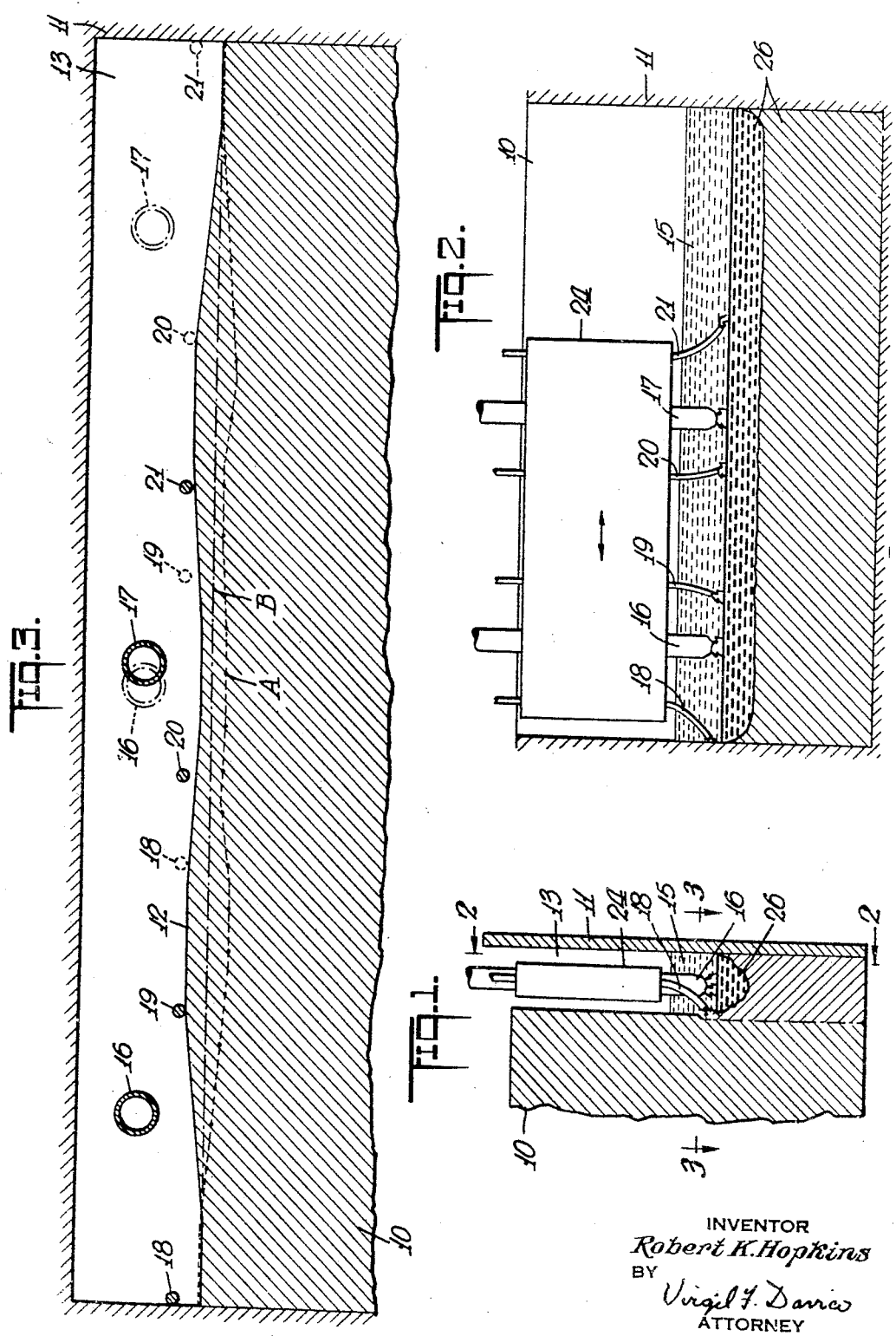
INVENTOR
Robert K. Hopkins
BY
Virgil F. Davies
ATTORNEY Patented Mar. 16, 1948

2,437,782

UNITED STATES PATENT OFFICE 2,437,782

MANUFACTURE OF COMPOSITE METAL ARTICLES

Robert K. Hopkins, New York, N. Y., assignor to The M. W. Kellogg Company, New York, N. Y., a corporation of Delaware Application June 18, 1945, Serial No. 600,174

4 Claims. (Cl. 22—204)

The present invention relates to the art of making composite metal articles, and more particularly to the art of forming a metal coating layer on a base metal by fusing the surface of the base metal and integrally bonding a coating metal of the desired composition to said fused surface.

In one known process of producing a composite metal article, a base metal workpiece with a substantially vertically disposed surface is oscillated relative to the metal producing and fusing elements of the apparatus. The surface fusing means comprises a plurality of spaced electrodes, which are oscillated in unison relative to the base metal workpiece, and which are simultaneously advanced relative to said workpiece in a direction transverse to the direction of relative oscillating movement to effect progressive areal coverage of the substantially vertically disposed surface by said electrodes in surface fusing relationship therewith.

In carrying out this process, the courses of the electrodes overlap during oscillations to assure complete coverage of the surface of the base metal workpiece, and their speeds relative to the base metal workpiece are substantially reduced near the ends of their strokes, due to the inherent characteristics of the oscillating mechanism employed. As a result of this condition, the metal fusing energy input across the substantially vertically disposed surface of the workpiece per unit length of electrode traverse is varied, so that the depth of fusion of the workpiece varies. The resulting composite article will therefore have an undulating line of substantial amplitude, where the base metal and the coating are integrally bonded together, thereby producing a metal coating of non-uniform thickness.

The coating of non-uniform thickness produced by this process has the disadvantage of requiring a greater quantity of coating metal to be deposited in order to assure a coating of minimum guaranteed thickness.

Also, a coating of non-uniform thickness in a composite article is disadvantageous and undesirable when fabricating products from such articles, since the apparatus and operations for handling these articles would normally be geared, set and adjusted to handle metal having definite constant qualities. Also, non-uniformity in the thickness of the coating metal may impart to the qualities of the material processed, such as resistance to flow, such variations as to upset the efficiency of these operations.

Moreover, a coating non-uniform in thickness on a composite article is undesirable when the article is to be welded. In the usual operations of welding composite articles together, the alloy coating metals are welded with corresponding alloy metal electrodes, and the carbon steel bases with carbon steel electrodes. To this end, welding grooves are cut of definite depth. If the alloy thickness is not uniform, it will be necessary to cut a groove for the greatest depth of alloy. As a result, where the coating alloy layer is of smaller thickness, alloy will be employed in part to weld the carbon steel sections of the composite articles together.

Also, when the variation in the thickness of the coating layer is substantial, it may not be possible to obtain a carbon steel weld deep enough to afford the necessary structural strength.

One object of the present invention is to provide a new and improved base metal body prepared to form a composite welded article with a substantially straight penetration line, a new and improved process by which alloy metal is produced, applied and fused to a base metal workpiece to form a coating of substantially uniform thickness thereon, and a new and improved composite welded article produced by this process.

In accordance with certain features of the present invention, the face of the base metal workpiece to be coated is contoured substantially the reverse of the penetration line formed in a straight-faced base metal workpiece. As a result of this process, the workpiece to be coated is thickest where there is the greatest current input, and is thinnest where the current input is the least. This reverse undulation in the contour of the face of the base metal substantially compensates for non-uniform penetration into the workpiece, and produces a composite article having a much straighter penetration line.

Various other objects, features and advantages of the invention will be apparent from the following particular description, and from an inspection of the accompanying drawings, in which—

Fig. 1 is a sectional view somewhat diagrammatic of apparatus used in manufacturing composite articles in accordance with the present invention;

Fig. 2 is a front sectional view taken along the line 2—2 of Fig. 1; and

Fig. 3 is a horizontal section taken along the lines 3—3 of Fig. 1.

The novel method of the present invention may be employed in the manufacture of coated articles having a wide range of compositions. The base metal may be carbon steel, iron or any of the ferrous or non-ferrous metals and alloys commonly used in the manufacture of machines, apparatus, vessels, containers, structural members, etc. The coating metal may be of any ferrous or non-ferrous metal or alloy, such as chrome steel, manganese steel, chrome-nickel steel, Monel metal, etc., having certain desirable properties, such as corrosion, oxidation and/or wear resistance, superior to those of the base metal.

The novel method may be employed for manufacturing coated articles that are substantially in their finished form after the coating operation, or it may be employed for manufacturing intermediate articles or workpieces, such as ingots, slabs, billets, cylinders and the like, from which the final articles are produced by working operations, such as forging, rolling, etc.

The apparatus for carrying out the process of the present invention may be similar to that shown in my prior United States Patents Nos. 2,279,990 and 2,191,481. As indicated in these patents, the base metal 10 in the form of an ingot, billet, slab, bar, etc., is associated with a mold 11 in such a way that the face 12 of the base metal to be coated is substantially vertically disposed, and defines with the mold walls a space 13 shaped and dimensioned to accommodate the coating metal. Mold 11 may be made of any suitable material such as iron, steel, copper or refractory material, and may be liquid-cooled during coating operations.

The coating metal is fused and deposited in the mold space 13 beneath a blanket of protective flux 15, and is united to the base metal 10 under the influence of electric current discharges from electrodes submerged at their lower ends beneath the surface of said flux blanket. The operation is so controlled that the whole of the top surface of the deposited metal, i. e., the deposited metal immediately beneath the flux 15, is in the molten condition throughout the period of operation.

Two hollow electrodes 16 and 17, and four wire electrodes 18, 19, 20 and 21, are shown for purposes of illustration, although any number and combination of these may be provided. These electrodes 16, 17, 18, 19, 20 and 21 as they are consumed, are fed endwise from reels by suitable feed motors in a suitable manner, such as that shown and described in my prior patents above referred to, and are guided through a water-cooled contact device 24 where contact communication between said electrodes and their respective current supplies is continuously maintained during the entire operation.

Since one of the primary functions of the wire electrodes 18, 19, 20 and 21 is to fuse surface metal of the base metal workpiece 10 in the region of the rising level of the liquid coating metal 26, the contact guide of each wire electrode in the contact device 24 is shaped to direct said wire electrode at an angle towards the surface of the base metal. In addition, the contact guides of the outer wire electrodes 18 and 21 are shaped to direct these electrodes laterally outward from the sides of the contact device 24, so that these wire electrodes can reach the outer edges of the workpiece 10.

The hollow electrodes 16 and 17 are made up of one or more of the major constituents of the desired coating metal, and may contain other constituents required to be fused with it. Other ingredients necessary to produce a coating metal of the desired analysis may be fed in pulverent, powder, granular or other fluent form to the fusing zone of the electrodes 16 and 17 through the hollows of said electrodes. These other ingredients in fluent form are metered and fed to the fusing zone of the electrodes 16 and 17 at controlled rates to produce with the metal from said electrodes 16 and 17 and the wire electrodes 18, 19, 20 and 21, a coating metal of the desired analysis.

As the electrodes 16, 17, 18, 19, 20 and 21 are consumed, they are fed endwise at controlled rates. At the same time, as the level of the deposited coating metal 26 in the mold space 13 rises, the contact device 24 and the electrodes 16, 17, 18, 19, 20 and 21 therein are raised in unison at a rate corresponding to the rising rate of said level by a reversible hoist motor (not shown) as indicated in my aforesaid patents, to maintain, during the entire operation, a substantially constant spacing between the lower ends of the electrodes and the surface of the base metal and the surface of the molten metal.

As already described, electrodes 18, 19, 20 and 21 are angularly directed to discharge in the zone of the meeting line between the surface of the deposited coating metal 26 and the face 12 of base metal 10, so as to present a fused surface to the rising deposited metal 26. In order that the surface of the base metal 10 be always in the fused condition for the full length of this zone, contact device 24 is oscillated back and forth along the length of mold space 13, and at the proper rate relative to base metal 10. This relative oscillatory movement may be accomplished, as for example, by having the base metal 10 and mold 11 supported on a rail mounted truck, and moving this truck back and forth by a suitable drive mechanism, while the contact device 24 and its electrodes are fixed against horizontal movement, as shown in my prior Patent No. 2,279,990, or by having the contact device 24 supported on a horizontally movable carriage, while the base metal and the mold are fixed against horizontal movement, as shown in my prior Patent No. 2,191,481.

The electrodes 16, 17, 18, 19, 20 and 21 are horizontally oscillated as a unit relative to the base metal 10 from one extreme position shown in Fig. 2, in which the end electrode 18 is close to one side edge of base metal 10, to the other extreme position in which the other end electrode 21 is close to the other side edge of the base metal. During this oscillatory movement the travels of the different wire electrodes 18, 19, 20 and 21 overlap for substantial distances in order to assure substantially complete coverage of the surface of the base metal, and the speed of oscillation of said electrodes varies, slowing down near the ends of their strokes, due to the inherent mechanical characteristics of the reciprocating device employed. Where the wire electrodes 18, 19, 20 and 21 overlap, and where they slow down for reverse movement, the current input from these electrodes into the base metal is the greatest, so that if the base metal 10 has initially a flat surface to which the coating metal is to be bonded, the final composite article will have an undulated bond or penetration line A approximately as shown in Fig. 3. Line A has comparatively deep channels where the courses of the wire electrodes 18, 19, 20 and 21 overlap, and where they slow down preparatory to reversal, hence the resulting coating will be of varying thickness.

In accordance with the process of the present invention, the base metal 10 is initially prepared, so that the surface to which the coating metal is to be bonded has a contour substantially the reverse of the penetration line which the composite article would have if the base metal were initially provided with a flat surface. To determine the shape of this contour, a sample composite article is formed by using a base metal having a flat surface. In all other respects, this base metal will be dimensioned to conform with the dimensions of the contoured base metal to be employed for the final product, and will have the same analysis and characteristics as the latter base metal. In the sample making process, all other conditions of the ultimate process are followed. The composite article formed by this trial process will have an undulated bond or penetration line A similar to that shown in Fig. 3. This line A is then plotted from the sample product, and a straight datum line B is drawn, joining the ends of this penetration line. The contour surface 12 is then plotted to extend on the side of the datum line B opposite penetration line A; the normal distance from any point on the contour surface line 12 to datum line B being substantially the same as the normal distance between the corresponding point on the penetration line A and the datum line B. The plotted contour surface 12 will be substantially the reverse of the penetration line A, except for slight modifications which may be desirable to compensate for irregularities in actual operating conditions. Such modifications may be determined by trial and error. The base metal ingot or billet 10 will have its surface 12 cut to afford a contour corresponding to that plotted as described, and as shown in Fig. 3.

It should be noted that at the sections where the courses of the wire electrodes 18, 19, 20 and 21 overlap, and where they slow down near the ends of their oscillating strokes, the thickness of the base metal 10 is greater. The depth of penetration or depth of fusion of the base metal 10 at these sections due to increased energy input from the overlapping wire electrodes 18, 19, 20 and 21 is correspondingly greater. This non-uniform penetration of the base metal 10 is compensated for by the initial varying thickness of the base metal, so that the resulting bond line of the composite article will be substantially straight.

Instead of determining the proper initial contour for the bonding surface of the base metal by first making a trial sample composite article with a flat-surfaced base metal workpiece as described, the contour may be determined by plotting the theoretical penetration line from the kilowatt hour input of the wire electrodes 18, 19, 20 and 21 per unit travel of these electrodes, and then plotting a contour line which is a substantial reverse from theoretical penetration line.

Although the method of the present invention is described in connection with an operation in which the base metal is supported with its contoured surface extending substantially vertically, it must be understood that as far as certain aspects of the invention are concerned, the operation may be carried out with said surface extending in any other direction.

As many changes can be made in the above method and article, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. In the method of uniting metals in which electrodes are oscillated across the bonding surface of a metal body while they are progressed along said surface to effect progressive areal fusion of said surface and in which variations in electric energy input into said surface by reason of the oscillations of said electrodes result in the fusion of varying depths of the metal of said body, the steps comprising, preparing a metal body with a bonding surface contoured to compensate for variations in electric energy input into said body due to the oscillations of the electrodes employed in fusing said surface, discharging electric current through gaps between a plurality of spaced electrodes and the bonding surface of said metal body to fuse metal of said body, depositing molten metal in contact with the fused surface of said metal body to effect an integral bond between said body and the deposited metal, and oscillating said electrodes in unison across said surface while advancing said electrodes along said surface to effect progressive areal coverage of said surface by said electrodes and to fuse metal of said body to depths required to provide a substantially straight line between the deposited metal and the metal of said body when the deposited metal solidifies.

2. In the method of uniting metals in which electrodes are oscillated across the bonding surface of a metal body while they are progressed along said bonding surface to effect progressive areal fusion of said bonding surface and in which variations in electric energy input into said surface by reason of the oscillations of said electrodes result in the fusion of varying depths of the metal of said body, the steps comprising, preparing a solid metal body with a bonding surface having a contour substantially the reverse of the penetration line of a composite metal article produced from a similar solid metal body having a straight bonding surface, discharging electric current through gaps between a plurality of spaced electrodes and said contoured surface to fuse metal of said body, depositing molten metal in contact with the fused surface of said metal body to effect an integral bond between said body and the deposited metal, and oscillating said electrodes in unison across said contoured surface while advancing said electrodes along said contoured surface to effect progressive areal coverage of said contoured surface by said electrodes and to fuse metal of said body to depths sufficient to compensate for variations in electric energy input into said contoured surface due to the oscillations of said electrodes whereby a straight line penetration of the deposited metal into the metal of said body results.

3. In the method of uniting metals in which electrodes are oscillated across the bonding surface of a metal body while they are progressed along said surface to effect progressive areal fusion of said surface and in which variations in electric energy input into said surface by reason of the oscillations of said electrodes result in the fusion of varying depths of the metal of said body, the steps comprising, preparing a solid metal body with a bonding surface having a contour substantially the reverse of the penetration line of a composite metal body produced from a similar metal body having originally a straight bonding surface, discharging electric current through gaps between a plurality of spaced electrodes and the contoured surface of said metal body to fuse metal of said body, depositing molten metal against said contoured surface while said metal body is supported with said surface non-horizontal to provide a substantially horizontal molten metal surface that progressively rises and covers said contoured surface, and oscillating said electrodes in unison across said contoured surface while advancing said electrodes along said contoured surface to effect a progressive areal coverage of said surface by said electrodes and to fuse metal of said body to depths required to provide a substantially straight line between the deposited metal and the metal of said body when the deposited metal solidifies.

4. In the method of uniting metals in which electrodes are oscillated across the bonding surface of a metal body while they are progressed along said surface to effect progressive areal fusion of said surface and in which variations in electric energy input into said surface by reason of the oscillations of said electrodes result in the fusion of varying depths of the metal of said body, the steps comprising, uniting a solid metal body having a straight surface with molten metal deposited against said surface while said bonding surface is fused by the action of electrodes as they are oscillated across and progressed along said surface, preparing a solid metal body having dimensions and characteristics similar to those of the first mentioned solid metal body but having a surface contoured substantially reversely from the penetration line in the composite body produced from said first mentioned metal body, discharging electric current through gaps between a plurality of spaced electrodes and said contoured bonding surface to fuse metal of said second mentioned metal body, depositing molten metal in contact with said contoured surface to effect an integral bond between said second mentioned metal body and the deposited metal, and oscillating said electrodes in unison across said contoured surface while advancing said electrodes along said contoured surface to effect progressive areal coverage of said surface by said electrodes, and to fuse the metal of said second mentioned metal body to depths required to provide a substantially straight line between the deposited metal and the metal of said second mentioned body when the deposited metal solidifies.

ROBERT K. HOPKINS.

REFERENCES CITED

The following references are of record in the file of this patent:

UNITED STATES PATENTS

| Number | Name | Date |
|---|---|---|
| 2,191,472 | Hopkins et al. | Feb. 27, 1942 |